Figure 1:
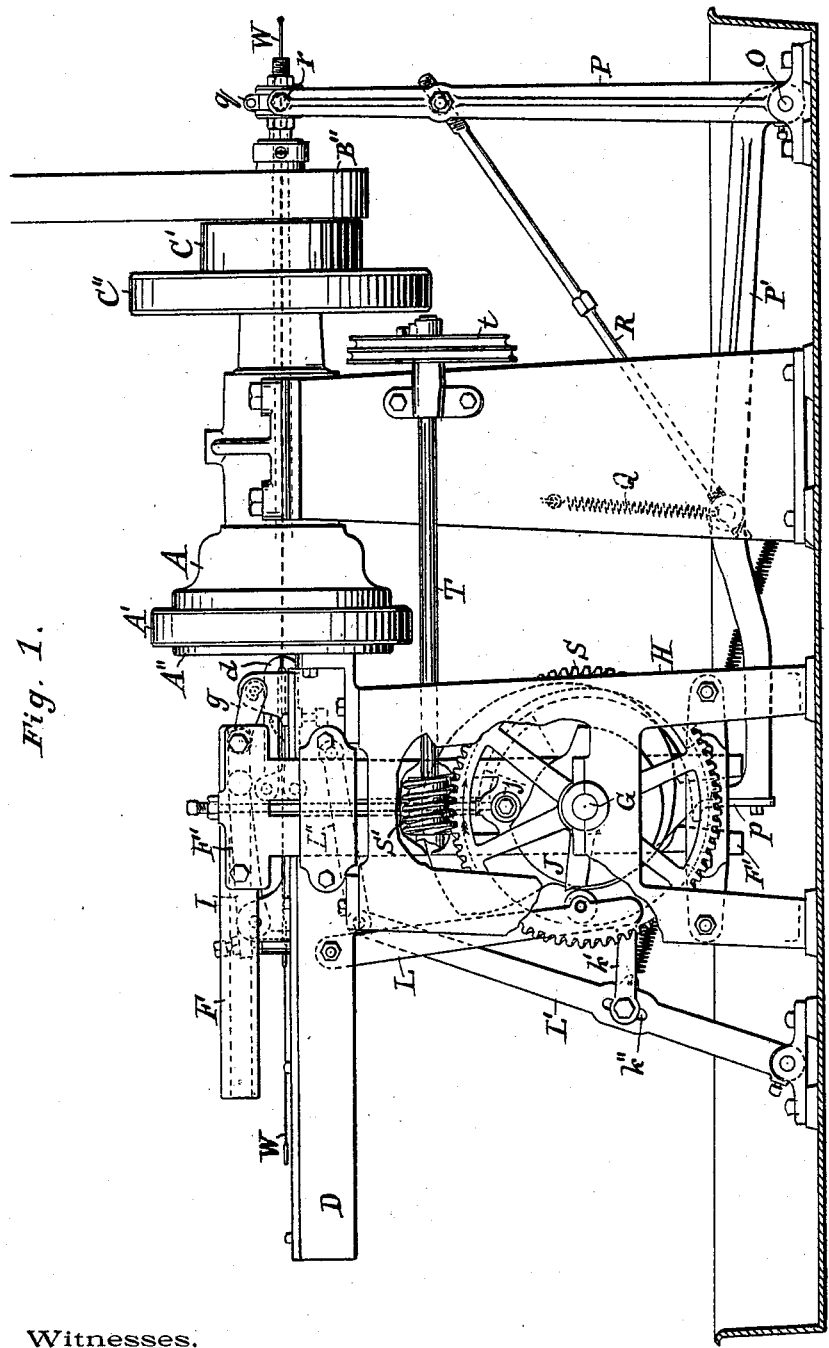

(No Model.)  5 Sheets—Sheet 1.

A. J. MORSE.
SWAGING MACHINE.

No. 588,648.  Patented Aug. 24, 1897.

Witnesses.
R. F. Dewey.
H. M. Seamans.

Inventor.
Arthur J. Morse
By C. H. Duell
his Attorney.

(No Model.)  5 Sheets—Sheet 2.

A. J. MORSE.
SWAGING MACHINE.

No. 588,648.  Patented Aug. 24, 1897.

Witnesses.  Inventor.
R. F. Dewey.  Arthur J. Morse
H. M. Seamans  By C. H. Duell
  his Attorney.

(No Model.) A. J. MORSE. 5 Sheets—Sheet 3.
SWAGING MACHINE.

No. 588,648. Patented Aug. 24, 1897.

Witnesses.
R. S. Dewey
H. M. Seamans

Inventor.
Arthur J. Morse
By C. H. Duell
his Attorney.

(No Model.)  5 Sheets—Sheet 4.
A. J. MORSE.
SWAGING MACHINE.
No. 588,648.  Patented Aug. 24, 1897.
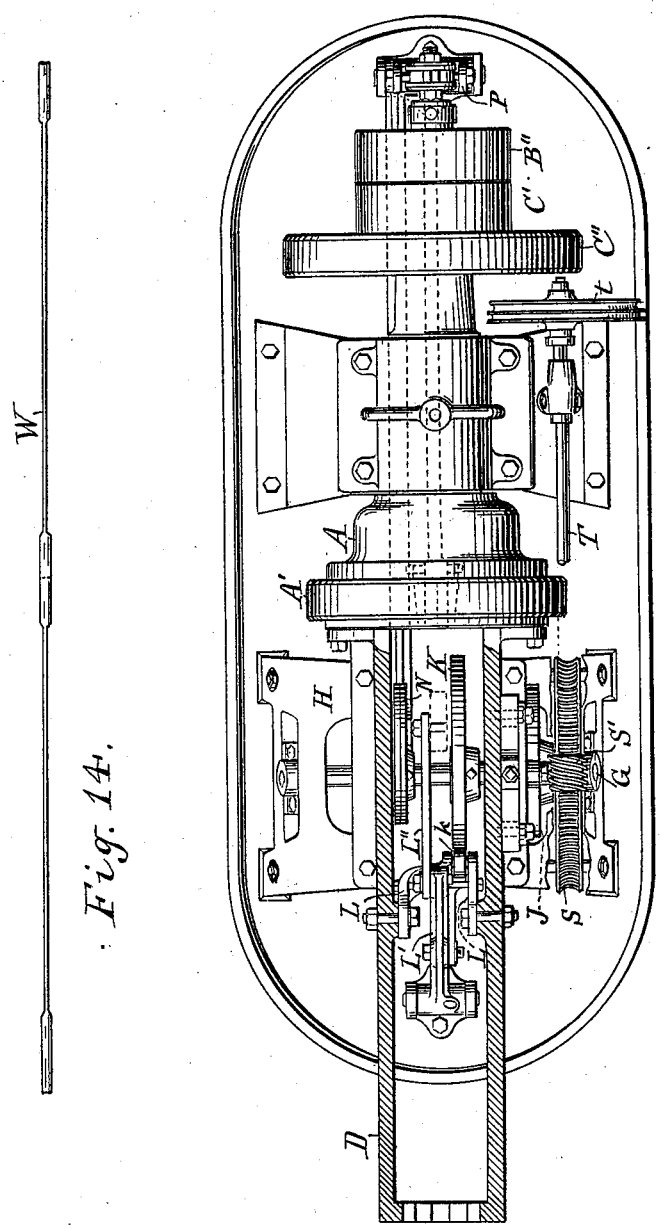
Witnesses.
R. B. Dewey
H. M. Seamans
Inventor.
Arthur J. Morse
By C. H. Duell
his Attorney.

(No Model.) 5 Sheets—Sheet 5.
A. J. MORSE.
SWAGING MACHINE.
No. 588,648. Patented Aug. 24, 1897.
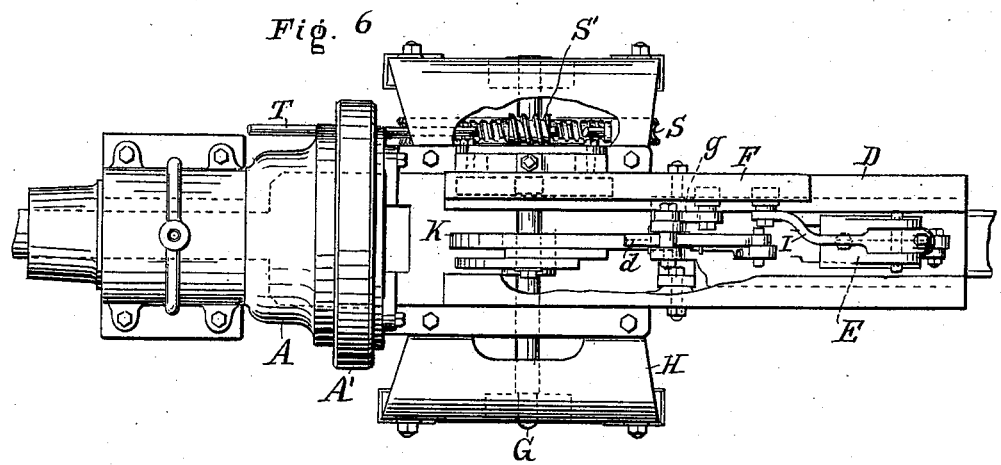
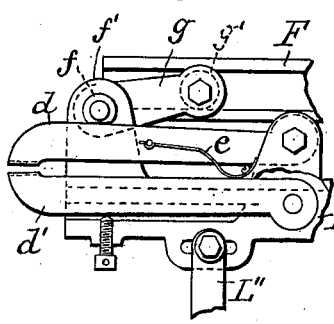
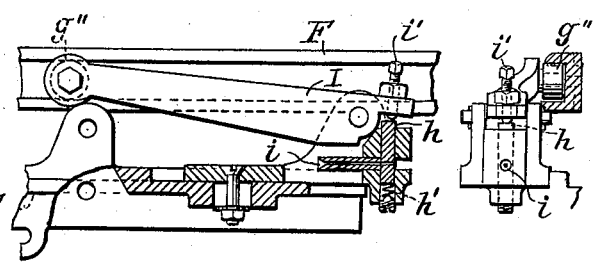
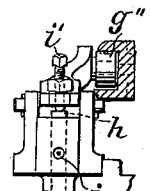
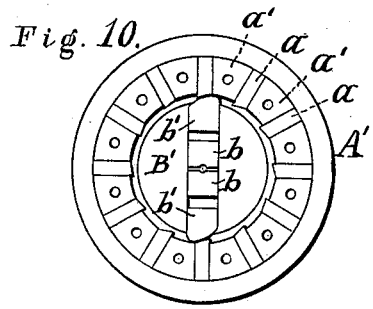
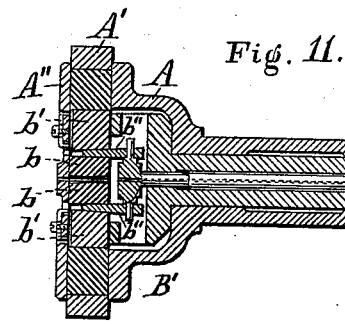
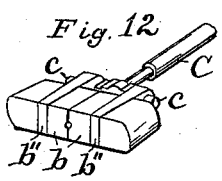
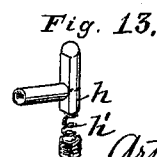
Witnesses.
R. S. Dewey.
H. M. Seamans.
Inventor.
Arthur J. Morse
By C. H. Duell
his Attorney.
THE NORRIS PETERS CO., PHOTO-LITHO., WASHINGTON, D. C.

UNITED STATES PATENT OFFICE.

ARTHUR J. MORSE, OF TORRINGTON, CONNECTICUT, ASSIGNOR TO THE MORSE-KEEFER CYCLE SUPPLY COMPANY, OF SALISBURY, CONNECTICUT.

SWAGING-MACHINE.

SPECIFICATION forming part of Letters Patent No. 588,618, dated August 24, 1897.

Application filed March 27, 1896. Serial No. 585,075. (No model.)

*To all whom it may concern:*

Be it known that I, ARTHUR J. MORSE, of Torrington, in the county of Litchfield, in the State of Connecticut, have invented new and useful Improvements in Swaging-Machines, of which the following, taken in connection with the accompanying drawings, is a full, clear, and exact description.

My invention relates to swaging-machines; and the object is to provide a rotary swaging-machine capable of swaging bicycle-spokes or similar articles, with means for feeding and cutting off the spokes the desired length.

To this end my invention consists in the combination, with the stationary cylindrical shell, of a circular series of tappets having beveled faces on their inner ends, the cylindrical shaft in the said shell carrying a rotary head containing a groove, a pair of dies in the groove, a pair of followers in the groove to engage the tappets, wedges between the followers and the dies, and a pipe sliding in the shaft and secured to the said wedges to vary the strokes upon the work.

My invention consists, further, in the combination, with a rotary swaging-machine of the class herein specified, of a shaft carrying a series of cams, a carriage and a guideway therefor, a gripping device mounted on the carriage, a cutting device mounted on the carriage, and suitable means connected to the carriage to reciprocate the same and to operate the grippers and cutters thereon, said means being operated by the said cams; and my invention consists also in certain other combinations of parts hereinafter described, and specifically set forth in the claims.

Figure 2:
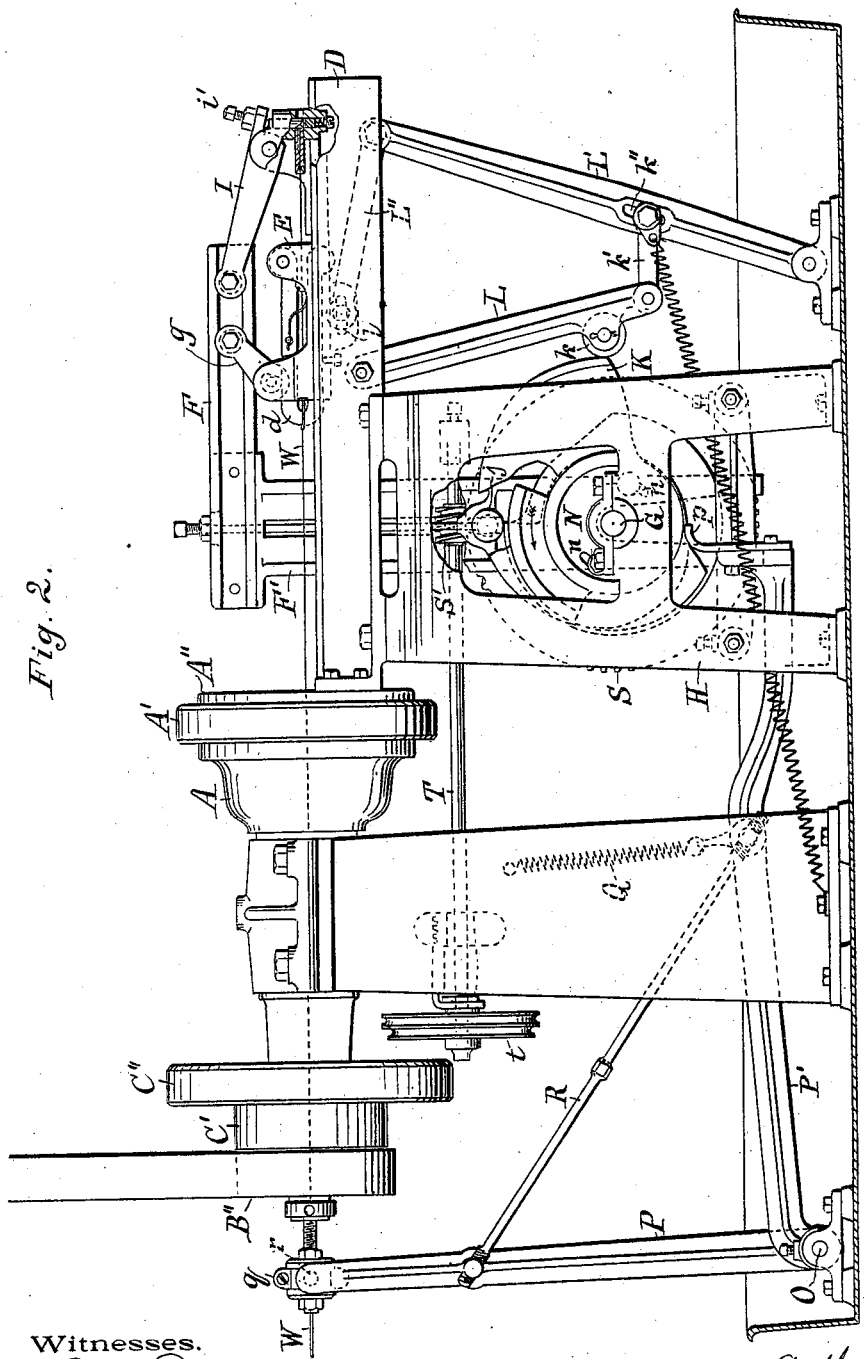
Figure 3:
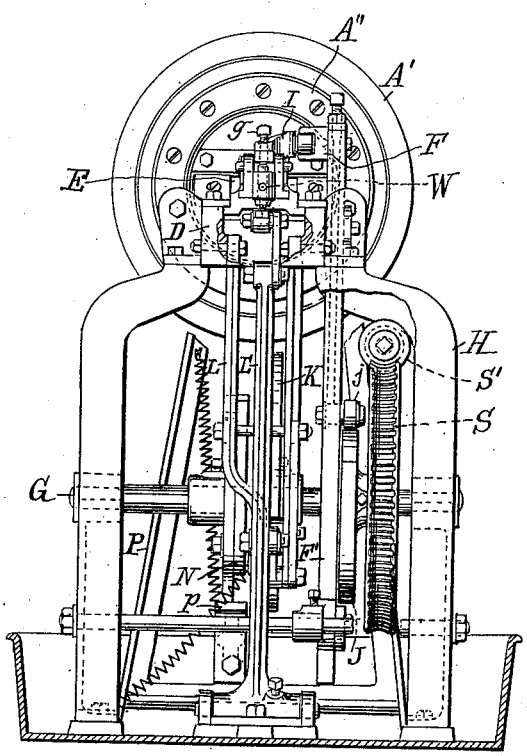
Figure 4:
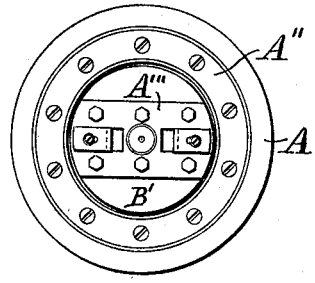

In the drawings hereto annexed and forming a part of this specification, Figure 1 is a side elevation, partly in section, of a swaging-machine embodying my invention. Fig. 2 is an elevation of the opposite side of the machine with the carriage removed from the dies. Fig. 3 is the front side elevation, several parts being broken away to show others more clearly. Fig. 4 is a face view of the cylindrical shell and the revolving head therein. Fig. 5 is a top plan view of the machine, the carriage being removed and the guideway being shown in section. Fig. 6 is a top plan view of the machine, including the carriage. Fig. 7 is an enlarged side view of the grippers, together with adjacent parts. Fig. 8 is an enlarged side view of the cutting devices and guide, partly in section. Fig. 9 is an end view of the devices shown in Fig. 8. Fig. 10 is a face view of the shell and rotatable head with the face-plate removed. Fig. 11 is a central longitudinal section of the shell and the movable parts therein. Fig. 12 is a perspective view of the dies, followers, and the wedges between them connected to the sliding tube removed from the rotatable shaft. Fig. 13 is a perspective view of the cutting-bolt and guide separated from the adjacent parts; and Fig. 14 is a view of two spokes before being cut apart, but after being swaged.

Referring specifically to the drawings, A is the stationary cylindrical shell or casting, one end of which is expanded to contain a rotatable head B' on the end of a cylindrical shaft B, extending horizontally and longitudinally within the shell. Across the end of the said head is a mortise or groove, and in the groove is a pair of sliding dies $b\ b$, a pair of followers $b'\ b'$ to engage the beveled faces of the tappets $a\ a$, &c., and a pair of wedges $b''\ b''$, which lie between the dies and the followers for the purpose of regulating the strokes or varying the size of the article being swaged. The said wedges are secured at one end to arms $c\ c$, extending at right angles to and from one end of a tube C within the shaft B. The parts are so arranged and connected together that when it is desired to change the distance between the dies and their followers it is only necessary to move the tube C in the shaft longitudinally in one direction or the other.

Secured to the end of the body of the shell is a circular series of tappets $a\ a$, &c., having beveled inner faces thereon to contact with the beveled ends of the said followers as the head is revolved. Encircling this series of tappets and the tapering blocks $a'\ a'$ between and separating them is a ring A', which prevents the tappets from working out of their grooves, and secured to the face of the said blocks is a circular face-plate A'', as shown in Fig. 4 of the drawings. Another face-plate A''' is secured to the revolving head to hold the dies and followers in place in the groove.

During the revolution of the head there are as many closures of the dies each revolution of the shaft as there are tappets in the circular series. The tappets are diametrically opposite each other, and this insures a stroke upon both followers simultaneously.

The tube connected with the wedges allows for the passage of the wire, rod, or bar W to be operated upon. The shaft B is revolved by means of a pulley B''. A loose pulley C' and a fly-wheel C'' are also shown on the shaft. The article W is fed in gradually at the end of the shaft carrying the pulley. When bicycle-spokes are to be operated upon, the wire W is fed in from a reel (not shown) through the tube C and between the dies $b$ $b$ in the head, and the operation is automatic and continuous, although intermittent.

Extending horizontally secured at one end to the stationary shell A or face-plate A'' and mounted on a frame is the guideway D for the carriage E. Mounted on the carriage at the end nearest the swaging-head are the grippers $d$ and $d'$. The grippers consist of a pair of arms journaled at one end to oscillate on bearings or bolts. The said arms lie one above and the other below the horizontal plane of the work W, and the latter is gripped between their free ends while it is being drawn through the dies. While the carriage is moving in the opposite direction or toward the dies, the upper gripping-arm $d$ is released and is forced upward by a curved spring $e$, secured at one end to the carriage. The lower gripping-arm $d'$ may be raised and lowered or adjusted to the diameter of the work by means of the small set-screw $e'$. The upper gripper is forced down and held in that position during the travel of the carriage in one direction or from the dies by means of a small cam $f$, adapted to bear upon the upper side of the arm $d$. The said cam is mounted on the end of a short shaft turning in a post $f'$ on the carriage. On the opposite end of this shaft is an arm $g$, provided at its free end with a roller $g'$, adapted to travel in a horizontal groove in a bar F above but parallel with the guideway. The said bar is secured in its position on the upper end of a vertically-reciprocating plate F', which extends downward nearly to the bottom of the frame and is bifurcated at its lower end to straddle a horizontal cam-shaft G, journaled in bearings in opposite sides of the frame H.

On the opposite end of the carriage E is mounted the cutting devices. The cutting device proper consists of a vertical bolt $h$, having a transverse passage therethrough for the spoke. This bolt is adapted to move vertically in its socket, and is held in its raised position, with its passage directly opposite a stationary passage in a guide $i$ for the spoke, by means of a small coil-spring $h'$ in the bottom of the socket below the bolt.

The cutting-bolt $h$ is depressed to cut off the spoke by means of a lever I, pivoted intermediate its length on the carriage. A set-screw $i'$, passing through the end of the said lever, makes contact with the upper end of the cutting-bolt $h$ when the opposite end of the lever is raised. This end of the lever is provided with a roller $g''$ to move in the same groove with the roller of the lever $g$, which operates the grippers. The gripper and cutter are operated at the same time by raising the bar F containing the groove. The said bar is raised by means of a cam J on the cam-shaft and a roller $j$ on the side of the plate F', riding on the periphery of the cam. This cam J is so shaped and arranged with relation to the other parts that the bar F is lowered when the grippers are nearest the dies and raised when the carriage has traveled to its greatest distance from the dies. Two other cams are mounted on the same shaft. The middle cam K, or the largest on the shaft, is the feed-cam. This cam moves the carriage in opposite directions to draw out the wire forming the spokes from between the dies. The connections between this cam K and the carriage E are shown very clearly in Fig. 2 of the drawings and consist of a double lever L, journaled at its upper ends in the guideway D and having a roller $k$ near its lower end between the sides thereof to bear on the periphery of the cam. The said lever being double allows the great projection on this cam K to pass between the sides of the lever when the latter swings toward the shaft. The lower end of this lever is connected by a link $k'$ with another lever L', which is journaled at its lower end to the base. The link $k'$ is adjustable in a slot $k''$ in the lever L' for the purpose of regulating the length of the travel of the carriage. A coil-spring connects the said levers with the base of the machine to draw them toward the cam-shaft. A link L'' connects the upper end of the lever L' to the lower side of the carriage. A slot $l$ in the lower side of the carriage permits the end of this link to be adjusted therein.

It will be apparent that when the cam K is rotated slightly in the direction indicated by the arrow shown in Fig. 2 of the drawings beyond the position shown the roller $k$ and levers will be drawn inward toward the cam-shaft by the coil-spring M and the carriage E moved toward the dies until the ends of the grippers nearly touch the same. When in this position, the cam J, controlling the grooved bar, allows the latter to drop, which causes the gripping-arms to grip the spoke and the cutter to cut off the finished spoke at the same time.

The third cam N on the cam-shaft is for the purpose of operating the wedges $b''$ $b''$ between the followers and the dies. The wedges must be drawn out to prevent the action of the dies upon the spoke some time before the carriage reaches the end of its travel to allow for the expanded portion or the space between the shoulders on the spokes. Just after the carriage reaches the end of its travel, however, the said wedges are again thrown in, and this prevents any possible recoil of the wire W during the backward movement of the carriage. The cam N, operating the wedges, is split or divided, so that the parts may be turned relatively to each other to vary the distance of the swaged part between the shoulders. Curved slots $n\ n$ in one of the parts and indicated in Fig. 2 serve, with binding-screws passing through the slots and entering the other part, to fix the said parts in the position desired. This cam N is connected to the tube or pipe C, secured to the wedges by the following means:

On the rear end of the base of the machine is a horizontal shaft O, on which is fulcrumed the ends of two levers. One of said levers, P, extends upward nearly vertically to the end of the tube C, protruding from the end of the driving-shaft, and the other lever, P', reaches inward below the cam-shaft, its free end being provided with a shoe $p$, bearing on the periphery of the divided cam. A coil-spring Q holds this lever in its raised position, with the shoe in contact with the periphery of the cam. A rod R extends from one lever to the other diagonally. By means of this rod swiveled in the said levers the wedges $b''\ b''$ may be adjusted between the dies and the followers. The end of the tube C is threaded and is provided with nuts on opposite sides of a loose ring $q$, which is journaled by studs $r\ r$, projecting from diametrically opposite sides in the upper end of the lever P, which is bifurcated. The diagonal rod R not only varies the angle formed by the levers, but retains them rigidly in the position in which they have been set.

On the cam-shaft G, journaled in the frame H, is a large worm-wheel S, engaging a worm S' on its upper side. This worm is mounted on a horizontal shaft T, extending at right angles to the cam-shaft. The worm-shaft is journaled in bearings in the frame of the machine and is provided at one end with pulleys $t$ of different sizes, one of which is to be connected to a counter-shaft overhead. (Not shown.)

By the means above described the feeding mechanism is operated independently of the swaging mechanism. Any suitable and well-known clutch device may be inserted in this worm-shaft, if desired.

The operation of the machine is as follows: The wire W to be swaged or formed and cut into spokes is fed from a reel into the end of the small tube C, connected to the wedges $b''\ b''$, until it reaches through and beyond the dies sufficiently to allow the grippers $d\ d'$ to take hold of it, the grippers then being in the position close to the dies, as shown in Fig. 1. The end of the wire held by the grippers forms the shoulder or expanded end of the first spoke. While the swaging-head B', carrying the dies $b\ b$, is revolved and the dies rapidly strike the wire on all sides to reduce the size thereof, owing to the followers coming in contact with the tappets held in the shell, the wire or spoke is drawn out slowly from the dies to the position shown in Fig. 2, this operation being effected by the rotation of the cam K in the direction of the arrow, engaging the system of levers connected to the carriage and stationary parts. Some time before the carriage reaches its extreme distance from the dies the cam N reaches a point where the shoe $p$, riding on its periphery, drops in toward the shaft, thereby withdrawing the wedges on opposite sides of the dies $b\ b$ sufficiently to prevent the dies from striking the spoke. The wire being drawn out while not operated on by the dies for a distance is provided with the expanded portion at the ends of two spokes, as shown clearly in Fig. 14 of the drawings. When, however, the wire has been drawn out to its fullest extent and just before the carriage is returned to its original position, the cam J on the cam-shaft lowers the grooved bar F, connected with the gripping and cutting devices, releasing the gripper $d$, which is raised by the spring $e$, and also at the same time releasing the cutting-bolt $h$, which is raised by its coil-spring $h'$ below it. Then the cam K allows the carriage to return to the dies or to its original position. It should be mentioned here, however, that while the carriage is returning the wedges are pressed in and the dies are operating on another spoke. This prevents any recoil of the wire that might possibly occur while the grippers are open. The carriage travels quickly in this direction. After reaching the dies the grippers $d$ and $d'$ are again closed and the cutting-bolt depressed, cutting off the end of the first spoke, if too long. Then the carriage proceeds to move away from the dies gradually, as before, and the process is repeated. Whenever the carriage returns after the first time, it will be apparent that the cutter takes effect in the middle of the expanded portion between two swaged portions, or, in other words, the cutter separates the spokes.

I do not desire to be limited to the precise construction shown and described herein, for it will be obvious that it may be changed without departing from my invention.

Having described my invention, what I claim as new, and desire to secure by Letters Patent, is—

1. In a swaging apparatus, the combination with the stationary part, a rotary head, dies and cams rigidly fixed in the said stationary part to operate the dies, of a horizontal shaft, a guideway extending from the swaging-head parallel with the axis of the driving-shaft, a carriage in the guideway to travel along the same, a cam on the horizontal shaft to move the carriage, grippers on the carriage to grip the work, a spring to raise one of the grippers, means to depress the gripper, a cutter mounted on the said carriage, and a connection between the second cam on the cam-shaft, and the grooved bar F to depress the gripper and cutter to operate both simultaneously as set forth.

2. In a swaging apparatus, the combination with the stationary part, a rotary head, dies and cams rigidly fixed in the said stationary part to operate the dies, of a horizontal shaft, a guideway extending from the swaging-head parallel with the axis of the driving-shaft, a carriage in the guideway to travel along the same, a cam on the horizontal shaft to move the carriage, grippers on the carriage, a spring to raise one of the grippers, a cam to depress the same, an arm on the cam-shaft provided with a roller, a horizontal bar containing a groove for the roller to travel in, a lever to operate the cutter also mounted on the carriage, a roller carried on one end to travel in the said groove, and an upright plate secured to the grooved bar and engaging the second cam on the cam-shaft, as set forth.

3. In a swaging apparatus, a rotary swaging-head carrying a pair of dies, a guideway secured to and extending from the said head, a carriage traveling in the guideway, a guide for the work on the carriage, a socket at one end thereof, a vertical bolt in the socket provided with a passage for the work, a spring in the socket below the bolt, a lever pivoted intermediate its length to the carriage, a set-screw passing through one end and engaging the vertical bolt, a roller on the opposite end of the lever, a grooved horizontal bar to form a guide for the roller to travel in, and suitable means to raise the grooved bar, as set forth.

4. In a swaging apparatus, a rotary swaging-head having a groove therein containing a pair of dies, a pair of followers and a pair of wedges, a tube extending longitudinally through the driving-shaft and secured at one end to the wedges, a lever fulcrumed on the base of the machine and connected to one end of the said tube by a universal joint, a lever extending from the same fulcrum horizontally, an adjustable rod extending diagonally between the two levers to change the angle between them, a shaft carrying a worm-gear and a cam, a shoe on the end of the lever engaging the cam, and a spring to raise the lever, as set forth.

In testimony whereof I have hereunto signed my name.

ARTHUR J. MORSE. [L. S.]

Witnesses:
GEO. B. BURRALL,
THOS. L. NORTON.